Feb. 4, 1964    G. H. J. BROERS    3,120,456
FUEL CELL ELECTROLYTE
Filed March 27, 1961    2 Sheets-Sheet 1

INVENTOR.
GERARD HERMAN JELKE BROERS
BY
ATTORNEYS

Feb. 4, 1964

G. H. J. BROERS 3,120,456

FUEL CELL ELECTROLYTE

Filed March 27, 1961

INVENTOR.
GERARD HERMAN JELKE BROERS
BY
Hammond & Littell
ATTORNEYS

United States Patent Office 3,120,456
Patented Feb. 4, 1964

3,120,456
FUEL CELL ELECTROLYTE
Gerard Herman Jelke Broers, Alkmaar, Netherlands, assignor to Nederlandse Organisatie voor Toegepast-Natuurwetenschappelijk Onderzoek ten behoeve van Nijverheid, Handel en Verkeer, The Hague, Netherlands, a corporation of the Netherlands
Filed Mar. 27, 1961, Ser. No. 98,456
Claims priority, application Netherlands Apr. 9, 1960
8 Claims. (Cl. 136—86)

The invention relates to an electrolyte body for a fuel cell for the galvanic combustion of gaseous fuels comprising a mixture of magnesium oxide powder and a salt or salt mixture which is in the molten state at the operation temperature of the cell.

One of the requirements an electrolyte body should meet, is that it should have a good conductivity, which means that its salt content should be as large as possible.

The object of the invention is the production of an electrolyte body having a good form-constancy at the operation temperature of the cell and the highest possible specific conductivity.

Another object of the invention is a process for the production of such an electrolyte body.

A further object of the invention is a fuel cell provided with such an electrolyte body.

Figure 5:
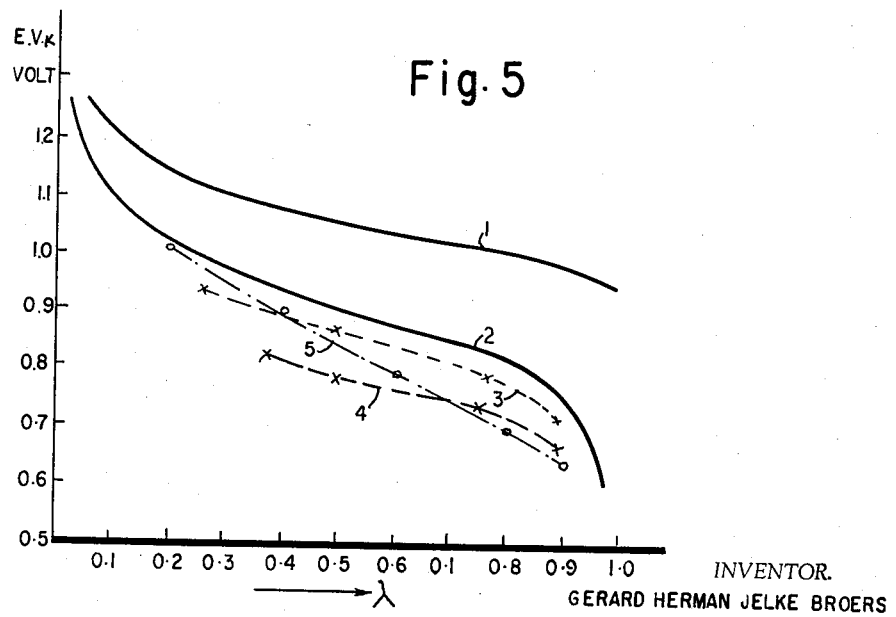

FIGURE 5 graphically compares the energy produced by a fuel cell containing the shaped electrolyte of the invention with the theoretical.

Surprisingly, it has been found that, if the right size of magnesium oxide powder grains is chosen, the salt content may be considerably increased, without the electrolyte body formed from these substances losing its form constancy at the operation temperature of the cell.

For this purpose the electrolyte body according to the present invention is formed from a mixture of from 40 to 60% of magnesium oxide powder having a particle size of less than $3\mu$ and of from 60 to 40% of a salt or salt mixture.

The requirements of the invention are well met by the cheap, easily purchasable "magnesium levissimum powder."

90% of the particles of this powder have dimensions of from $0.6\mu$ to $0.1\mu$.

For a salt it is preferred to use a low-melting mixture such as for instance lithium sodium carbonate, the melting point of which lies at 510° C., or a quaternary mixture of $Li_2CO_3$, $Na_2CO_3$, $K_2CO_3$ and $CaCO_3$ having a melting point of 365° C. Other mixtures of alkali carbonates and/or earth alkali carbonates can also be used.

The body can be formed by heating the mixture above the melting temperature of the salt mixture and applying this kneadable mixture to a carrier, in which case one of the electrodes of the cell can serve as carrier.

However, it is preferred to form the body by pressing a mixture of the salt and the magnesium oxide powder into the desired form.

It is desirable that the powder and the salt or salts in the body should be mixed as thoroughly as possible.

To this end, if granulated salts are started from, the magnesium oxide powder is mixed with the salt at room temperature, subsequently this mixture is at least one time heated above the melting temperature of the salt, and ground after each heating, after which the electrolyte body is formed from the electrolyte powder thus obtained.

The present process has the further advantage that the weight per unit of volume of the electrolyte powder is considerably increased, which may be important in forming the electrolyte body by pressure.

As observed above, it has been found that a relation exists between the particle size of the magnesium oxide powder and the salt content allowable in the electrolyte body.

This relation was established by preparing and subsequently examining mixtures of salt and magnesium oxide powder of various particle sizes.

From each powder fraction five mixtures were composed having successively 10, 20, 30, 40 and 50% by weight of lithium sodium carbonate.

Cylinders measuring 1.3 cm. in diameter and 1.5 cm. in height were pressed from these mixtures.

These cylinders were heated, first for 24 hours at 700° C. and, after observation of their form, for another 24 hours at 850° C. From this process it appeared that pastilles which had suffered no deformation at 700° C. did not suffer any at 850° C. either.

The following table gives a survey of the results.

*Table I*

DEFORMATION OF $LiNaCO_3$—MgO MIXTURES WHEN HEATED FOR 24 HOURS AT 700° C. AND SUBSEQUENTLY 24 HOURS AT 850° C.

| Particle size MgO | Percent by weight of $LiNaCO_3$ | | | | |
|---|---|---|---|---|---|
| | 10 | 20 | 30 | 40 | 50 |
| $0.08$–$0.1\mu$ | — | — | — | — | + |
| $1\mu$ | — | — | — | — | +++ |
| $1$–$3\mu$ | — | — | — | — | +++ |
| $3$–$10\mu$ | — | — | — | — | +++ |
| $10$–$25\mu$ | — | — | — | + | +++ |
| $25$–$40\mu$ | — | — | — | ++ | +++ |
| $30$–$100\mu$ | — | — | — | +++ | +++ |

— = no deformation.
+++ = strong alteration.
++ = moderate alteration.
+ = just perceptible deformation.

Figure 1:
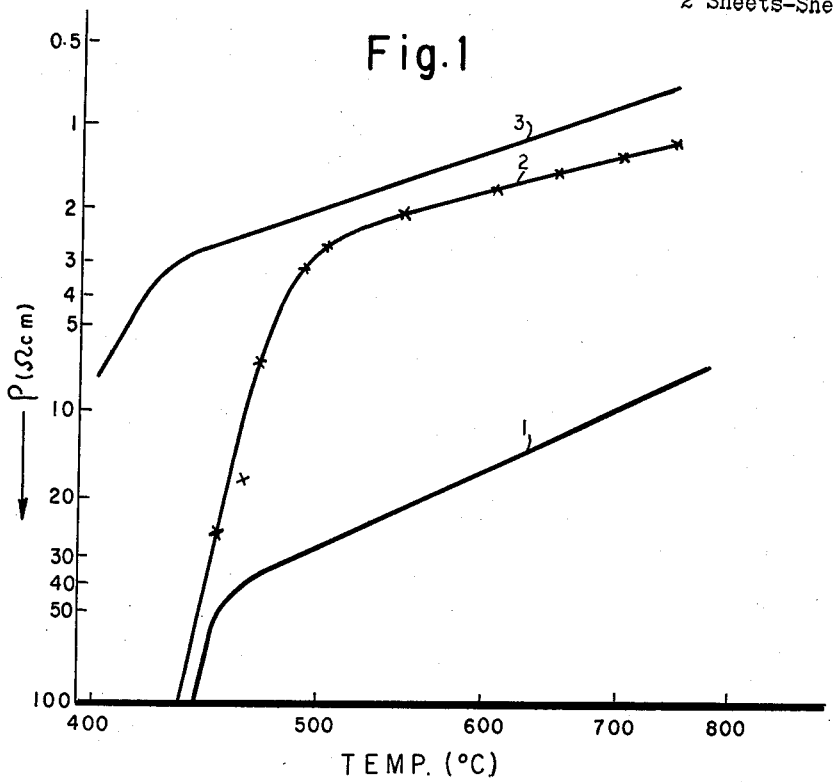
FIGURE 1 shows the specific conductivity of the electrolyte of the invention in comparison with prior art electrolytes.

From the above table it follows that even from a mixture of 30% by weight of lithium sodium carbonate and 70% by weight of magnesium oxide powder having a particle size of from 30 to $100\mu$ a good, formstable electrolyte body can be obtained. The salt content, however, is relatively small and because of this the conductivity is relatively low. At a particle size of about $10\mu$ the mixture is formstable above the melting temperature even with a salt content of 40%. However, at this salt content the gas density and the specific conductivity of the body are considerably better than they were in the electrolyte bodies in use to date, which comprise a porous carrier body the pores of which are filled up with molten salt. The best results were obtained with the powder having a particle size of from 0.08 to $0.1\mu$, by which a sufficient form-constancy and a high conductivity were attained when the salt content of the mixture was 50%. In FIGURE 1 is indicated the specific conductivity of such a mixture in comparison with that of the prior art electrolyte bodies.

The curve 1 represents the specific resistance at various temperatures of an electrolyte body made of a sintered magnesium oxide carrier impregnated with a mixture of molten salts. The composition of the electrolyte body was: 70% by weight of MgO; 10% by weight of Na₂CO₃; 10% by weight of Li₂CO₃ and 10% by weight of K₃CO₃.

The curve 2 represents the course of an electrolyte body according to the invention, consisting of a mixture of 50% by weight of MgO powder of about 0.1μ and 50% by weight of LiNaCO₃.

In the curve 3 the resistance of a salt mixture at various temperatures is indicated for comparison's sake; the salt mixture being composed of equal quantities by weight of Li₂CO₃, of Na₂CO₃ and of K₂CO₃.

From this figure it appears that an electrolyte body according to the invention has a specific resistance which is about 10 times lower than that of the prior art electrolyte bodies consisting of a carrier impregnated with salts, and that it approaches the conductivity of a molten salt mixture, so that it is possible in a cell provided with the new electrolyte body for the losses to be kept very low.

When applying the electrolyte body in a fuel cell, in which powdered electrodes are present on either side of the electrolyte body, "drowning" of the electrode powders by the molten salt at operation temperature should be prevented. Hereto the electrode powder particles (and consequently also the pores between said particles) should be considerably larger than the salt-filled spaces between the magnesium oxide particles in the electrolyte body.

On the other hand the electrode powders should not be coarse, as the electrochemical activity depends on the total surface of the three-phase contact places of gas, electrode and electrolyte in the cell, the size of which surface decreases as the electrode powders get coarser.

Therefore, it is clear that the best results are obtained with the magnesium oxide powder having the smallest particle size, as in this case the highest salt content as well as the highest conductivity are obtained in the electrolyte body and in addition to this the electrochemical activity can be optimal.

Figure 2:
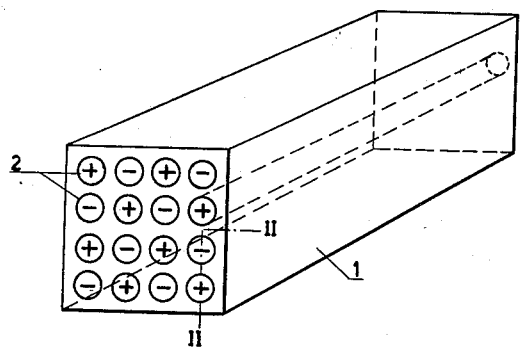
FIGURE 2 represents a shaped electrolyte of the invention.
Figure 3:
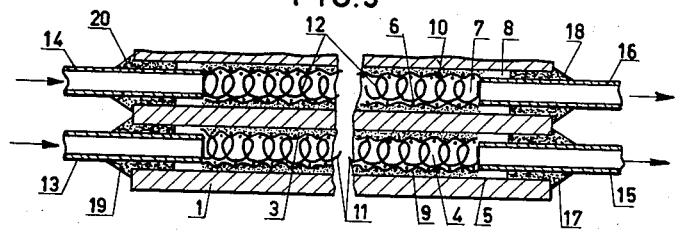
FIGURE 3 is a cross-section through the shaped electrolyte of FIGURE 2, provided with electrodes and supply and discharge pipes for the gases along the line II—II in FIGURE 2.
Figure 4:
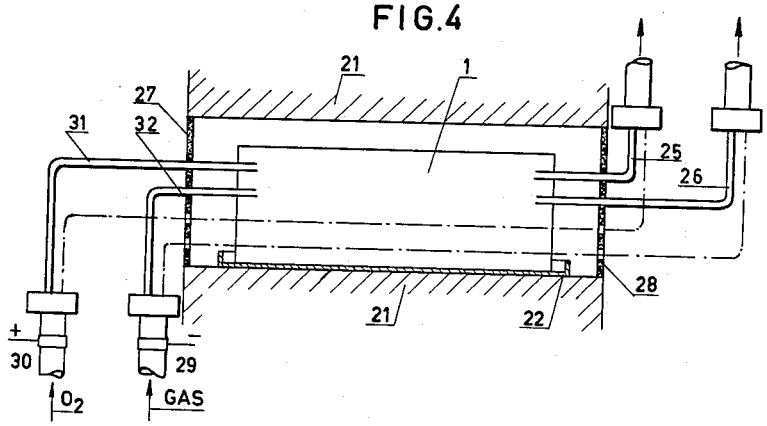
FIGURE 4 is a fuel cell provided with the shaped electrolyte according to FIGURE 2.

In FIGURES 2, 3 and 4 an electrolyte body and a fuel cell provided with such a body are represented as an embodiment according to the invention.

In FIG. 2 the reference numeral 1 denotes an electrolyte body made from a mixture of magnesium oxide powder and a carbonate mixture.

In the longitudinal direction of this body are present channels 2 having a diameter of 1 cm. and a distance between the centre lines of 1.5 cm.

In said embodiment 8 channels for the passage of air and 8 channels for the combustion gas were employed.

However, it is also possible, more especially so if the combustion gas is of slight reactivity, such as for instance CH₄, to diminish the current density on the gas side at the expense of the cathodic current density, for instance by employing 6 channels for the air and 10 channels for the gas, as by this arrangement the polarization at the electrodes in the gas channels decreases.

In FIG. 3 a gas channel 7 and an air channel 4 of the body 1 are shown in cross-section. A thin layer of metal powder 6, consisting for instance of a mixture of iron and nickel powder and serving as electrode, is present on the wall 8 of the gas channel 7. Against this layer is disposed the metal gauze 10, which is used for drawing current. Said gauze, which will for instance consist of nickel, has a mesh width of from 1 to 2 mm. The nickel gauze 10 is pressed against the metal powder 6 by the helical wire 12 consisting of a resilient metal such as for instance chrome nickel having a diameter of about 1 mm. Said helix has a pitch of from 10 to 15 mm. and is fixed to the metal supply pipe 14 and the discharge pipe 16 for the combustion gas, and it leads the current from the nickel gauze to said pipes, which at the same time serve as exterior connection to the element.

In the same manner a metal powder 3 acting as oxygen electrode (for instance silver powder) is present against the wall 5 in the air channel 4, by which arrangement the metal wire helix 11 presses the metal gauze 9 against the powdered electrode and at the same time, leads the current to the supply- and discharge-pipes 13, 15 for the oxygen-containing gas. The gauze may consist of silver or some other material such as for instance Nichrome.

It is also possible to leave out the intermediate gauze layer completely and to have the metal helixes in immediate contact with the powdered electrodes. However, in that case it is to be recommended to employ a helix having a smaller pitch, for instance of from 3 to 5 mm.

At the ends of the channel 4 are indicated the metal supply and discharge pipes for the air 13 and 15, and at the channel 7 the supply and discharge pipes 14 and 16 for the combustion gas. Said pipes are fixed in the body 1 in a gas-tight manner by a cement 17, 18, 19, 20. This cement can suitably consist of a mixture of magnesium oxide and carbonates of approximately the same composition as the body 1.

FIG. 4 shows a complete fuel cell, indicated by 1, provided with supply and discharge pipes, in a furnace 21, which is used for thermic insulation. The sides of the oven are closed by plates of a fireproof material 27, 28, which plates at the same time receive the weight of the pipes 25, 26, 31, 32. If desired, the body 1 can be introduced into the oven together with a flat metal trough 22.

All the gas supply pipes 32 are connected to a manifold 29, which at the same time serves as current terminal, and in the same manner the air pipes 31 are connected to a manifold 30.

In the same manner the exhaust gases are discharged through manifolds.

An electrolyte body according to FIG. 2 having dimensions of 6.5 by 6.5 by 25 cm. was made by heating a mixture of a powdered metal oxide and a salt according to this invention, for instance a mixture of 50% by weight of magnesium oxide powder having a grain size of less than 0.1μ and 50% by weight of lithium-sodium carbonate, to 700° C., subsequently grinding the mass obtained to a powder and after this pressing said powder at about 600° C. in a heat-resisting matrix so as to form it into a body. The pressed body was pushed from the matrix with the aid of a cooled stamp, and slowly cooled in a preheated oven at 600° C. After this the channels 2 were bored into this body. It is also possible, to provide the pressing matrix with cores which form the channels also at 600° C., and this is to be recommended, as boring the cooled material is a difficult and time-consuming treatment.

Under working conditions the electrode powders adhere to the electrolyte body of themselves. When applying said powders to the wall of the channels of a cooled electrolyte a binding agent such as water glass should be used, in order to obtain a tightly joined layer of grains of a thickness of from 0.1 to 0.2 mm. The metal powders which were used, had been obtained by a reduction of the corresponding oxides in the manner as described in U.S. patent application 760,394, now U.S. Patent 2,980,749, issued April 18, 1961.

The dimensions of the body have been chosen in such a manner that a considerable current can be drawn; however, the voltage is slight and to obtain higher voltages several elements should be connected in series.

The metal wire helixes 11, 12 are connected, for instance by welding, to the supply and discharge pipes 13, 14, 15, 16. Said helixes are wound in such a way that their exterior diameter is somewhat smaller than the interior diameter of the channels 2. After the helixes have been introduced into the channels, the helixes are, by a rotation of the pipes, expanded so far as to press firmly against the metal gauze of the electrodes, so that a good lasting contact is secured.

This fuel cell was kept in operation for a considerable time, without any disturbances presenting themselves. Water gas containing 50 mol percent of CO and 50 mol percent of $H_2$ was employed as the combustion gas; a mixture of 71 mol percent of air and 29 mol percent of $CO_2$ as the cathodic gas. Gas and air were throughout supplied in stoichiometric ratio, so that approximately 3½ times as much was used of the air mixture as of the gas mixture. Eight channels were used for the gas and the same for the air mixture.

When it is put into operation the whole of the cell should by slow degrees be brought up to the operation temperature. This may be effected by introducing preheated gas and air, as well as by heating the oven.

During operation, particularly when extremely high temperatures were applied, it appeared that sometimes a little molten salt sags down from the body and is collected into the trough 22. If desired, a little molten carbonate may now and then be supplied at the upper side of the electrolyte body to compensate for this loss. When working temperatures not higher than 600° C. were used, hardly any sagging of the molten electrolyte took place.

In the following tables a survey is given of the working results of this cell under various conditions. The temperature was 700° C. throughout; the active anodic as well as the active cathodic electrode surfaces were 500 cm.$^2$ each. Under ideal circumstances and at complete galvanic combustion a current of maximally 2.24 ampere per liter (20° C., 1 atm.) per hour of burnt gas may be obtained (the ideal efficiency of the complete galvanic combustion at 700° C. for this gas mixture being 69%; when the combustion is incomplete it may be higher).

In Table II and III is shown how the cell behaves at a change of the supply velocity of the gases at a constant drawing of current of 25 amperes and 50 amperes respectively. Table IV shows the values, obtained at a constant supply velocity of 31 l. of the mixture of CO and $H_2$ per hour and 108 l. of the mixture of air and carbon dioxide and varied drawing of current.

The following symbols are used in the tables:

$v$ = supply velocity of combustion gas in liters per hour (l./h.);
$I_m$ = the maximal current intensity corresponding to $v$, in amps. (a.);
$I$ = intensity of the current drawn from cell in amps. (a.);
$i$ = current density in ma./cm.$^2$ of electrical surface;
$\lambda$ = degree of conversion gas and air oxygen = $I/I_m$;
$V_k$ = terminal voltage of the cell in volts;
$w = I \cdot V_k$ = exterior electric power in watts;
$\eta th$ = thermic efficiency of the galvanic combustion relative to the total amount of the gas passed through;
$\eta th/\lambda$ = thermic efficiency relative to the amount of gas converted.

*Table II*

| $v$ gas | $v$ air + $CO_2$ | $I$ | $I_m$ | $\lambda$ | $V_k$ | $w$ | $\eta th$, percent | $\eta th/\lambda$, percent |
|---|---|---|---|---|---|---|---|---|
| 45 | 158 | 25 | 101 | 24.8 | 0.94 | 23.5 | 17.0 | 69.0 |
| 22.5 | 79 | 25 | 50.5 | 49.5 | 0.87 | 21.8 | 31.5 | 64.0 |
| 15 | 52.5 | 25 | 33.6 | 74.5 | 0.80 | 20.0 | 43.7 | 59.0 |
| 12.5 | 43.8 | 25 | 28 | 89.0 | 0.71 | 17.8 | 46.5 | 52.0 |

*Table III*

| $v$ gas | $v$ air + $CO_2$ | $I$ | $I_m$ | $\lambda$ | $V_k$ | $w$ | $\eta th$, percent | $\eta th/\lambda$, percent |
|---|---|---|---|---|---|---|---|---|
| 60 | 210 | 50 | 134 | 37.2 | 0.83 | 41.5 | 22.5 | 60.5 |
| 45 | 158 | 50 | 101 | 49.5 | 0.79 | 39.5 | 28.6 | 58.0 |
| 30 | 105 | 50 | 67.2 | 74.5 | 0.74 | 37.0 | 40.2 | 54.0 |
| 25 | 87.5 | 50 | 56 | 89.0 | 0.67 | 33.5 | 43.6 | 49.0 |

*Table IV*

| $I$ | $I_m$ | $i$ | $\lambda$ | $V_k$ | $w$ | $\eta th$, percent | $\eta th/\lambda$, percent |
|---|---|---|---|---|---|---|---|
| 14 | 70 | 28 | 20 | 1.01 | 14.1 | 14.8 | 74.0 |
| 28 | 70 | 56 | 40 | 0.90 | 25.2 | 26.5 | 66.2 |
| 42 | 70 | 84 | 60 | 0.79 | 33.2 | 35.0 | 58.3 |
| 56 | 70 | 112 | 80 | 0.70 | 39.2 | 41.2 | 51.5 |
| 63 | 70 | 126 | 90 | 0.64 | 40.3 | 42.5 | 47.2 |

In FIGURE 5 these results are graphically represented in comparison with the combustion under ideal conditions. Curve 1 indicates the theoretical $V_k$ which can be calculated from the energy which can be obtained as a function of the degree of conversion $\lambda$ when the conversion is an ideal (reversible) one; curve 2 indicates the (lower) theoretical EMK, which is calculated from the composition of the outstreaming gas, also as a function of the degree of conversion $\lambda$. Curves 3, 4 and 5 indicate the $V_k$ as a function of $\lambda$, as it was obtained by the measurements mentioned in the Tables II, III and IV. From these curves it is evident that the voltage obtained and, therefore, also the power obtained, approach the theoretically possible.

I claim:

1. A method of forming a high temperature-stable, shaped electrolyte body for a high temperature fuel cell for the galvanic combustion of gaseous fuels which comprises the steps of thoroughly mixing 40 to 60% by weight of magnesium oxide powder having a particle size of less than 3 microns with 60 to 40% by weight of an electrolyte salt selected from the group consisting of $Li_2CO_3$, $Na_2CO_3$, $K_2CO_3$, $CaCO_3$ and mixtures thereof, heating said mixture above the melting temperature of the electrolyte salt, cooling and subsequently grinding the resolidified mixture, heating and molding the ground mixture into the desired shape at a temperature above the melting point of the electrolyte salt.

2. The method of claim 1, wherein 90% by weight of the magnesium oxide powder has a particle size of between 0.06 and 0.1 micron.

3. The method of claim 1, wherein said heating and molding of the ground mixture is carried out at temperatures between 600 and 700° C.

4. A method of forming a high temperature-stable, shaped electrolyte body for a high temperature fuel cell for the galvanic combustion of gaseous fuels which comprises the steps of thoroughly mixing about 50% by weight of magnesium oxide powder having a particle size of less than 1 micron with about 50% by weight of a crystalline mixture of lithium carbonate and sodium carbonate, heating said mixture to a temperature of about 700° C. for a time sufficient to fuse the carbonates, cooling the fused mixture and grinding the resolidified mixture, heating and molding the ground mixture into the desired shape at a temperature between about 600° C. and 700° C., and recovering said shaped electrolyte body.

5. The method of claim 4, wherein 90% by weight of the magnesium oxide powder has a particle size of between 0.06 and 0.1 micron.

6. A high temperature-stable, shaped electrolyte body for a high temperature fuel cell for the galvanic combustion of gaseous fuels, consisting of an intimate mixture of 40 to 60% by weight of magnesium oxide powder having a particle size of less than 3 microns and 60 to 40% by weight of an electrolyte salt selected from the group consisting of $Li_2CO_3$, $Na_2CO_3$, $K_2CO_3$, $CaCO_3$ and mixtures thereof.

7. A high temperature fuel cell for the galvanic combustion of gaseous fuels comprising a casing, a high temperature-stable, shaped electrolyte body consisting of an intimate mixture of 40 to 60% by weight of magnesium oxide powder having a particle size of less than 3 microns and 60 to 40% by weight of an electrolyte salt selected from the group consisting of $Li_2CO_3$, $Na_2CO_3$, $K_2CO_3$, $CaCO_3$ and mixtures thereof, electrodes of opposing polarity in contact with and attached to said shaped electrolyte body, metal gauzes in contact with both layers of electrodes, said metal gauzes being resistant to both the circulating gases and the electrodes, helical metal wire in contact with and pressing against said metal gauzes incorporating the metal wire, the metal gauzes, the electrodes and the shaped electrolyte body in a rigid relationship within said casing, means for supplying one of said electrodes with a fuel gas, means for supplying the other of said electrodes with an oxidizing gas, and means for withdrawing electrical energy from said electrodes of opposing polarity.

8. In a multi-electrode high temperature fuel cell, a casing, a monolithic electrolyte body consisting of an intimate mixture of 40 to 60% by weight of magnesium oxide powder having a particle size of less than 3 microns and 60 to 40% by weight of alkaline carbonates, said electrolyte body being provided with parallel cylindrical passages, the inner walls of said passages being provided with porous electrodes which are built up from a layer of powdery metal, a fine metal gauze in contact with said electrode, and a helical metal wire in contact with said gauze and with supply pipes for supplying gases to the electrodes, substantially one-half of the electrodes being cathodes, the remaining half being anodes.

References Cited in the file of this patent

UNITED STATES PATENTS

| | | |
|---|---|---|
| 2,276,188 | Greger | Mar. 10, 1942 |
| 2,914,596 | Gorin et al. | Nov. 24, 1959 |
| 2,969,315 | Bacon | Jan. 24, 1961 |

FOREIGN PATENTS

| | | |
|---|---|---|
| 271,581 | Great Britain | June 2, 1927 |